US012581421B2

(12) United States Patent
Zhang et al.

(10) Patent No.: US 12,581,421 B2
(45) Date of Patent: Mar. 17, 2026

(54) METHOD FOR DETERMINING A SENDING POWER OF AN UPLINK ELEMENT, AND DEVICE

(71) Applicant: ZTE CORPORATION, Guangdong (CN)

(72) Inventors: Shujuan Zhang, Guangdong (CN); Zhaohua Lu, Guangdong (CN); Bo Gao, Guangdong (CN); Chuangxin Jiang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 532 days.

(21) Appl. No.: 18/020,108

(22) PCT Filed: Aug. 9, 2021

(86) PCT No.: PCT/CN2021/111389
§ 371 (c)(1),
(2) Date: Feb. 7, 2023

(87) PCT Pub. No.: WO2022/028614
PCT Pub. Date: Feb. 10, 2022

(65) Prior Publication Data
US 2023/0276370 A1 Aug. 31, 2023

(30) Foreign Application Priority Data
Aug. 7, 2020 (CN) ......................... 202010791625.X

(51) Int. Cl.
*H04W 52/14* (2009.01)
*H04W 52/32* (2009.01)
*H04W 52/42* (2009.01)

(52) U.S. Cl.
CPC ....... *H04W 52/146* (2013.01); *H04W 52/325* (2013.01); *H04W 52/42* (2013.01)

(58) Field of Classification Search
CPC . H04W 16/28; H04W 72/1268; H04W 52/10; H04W 52/08; H04W 72/232;
(Continued)

(56) References Cited

U.S. PATENT DOCUMENTS

2019/0261281 A1 8/2019 Jung
2020/0228225 A1 7/2020 Bhamri

FOREIGN PATENT DOCUMENTS

CN 108111272 A 6/2018
CN 108631987 A 10/2018
(Continued)

OTHER PUBLICATIONS

ZTE, Sanechips, "Remaining details on PT-RS," R1-1715450, 3GPP TSG RAN WG1 Meeting NR#3, Agenda item: 6.2.3.4: 7 pages (Sep. 2017).
(Continued)

*Primary Examiner* — Tu X Nguyen
(74) *Attorney, Agent, or Firm* — KDW FIRM PLLC

(57) ABSTRACT
Provided are a method and apparatus for determining a sending power of an uplink element, a device and a storage medium. The method includes the following: determining X spatial relationship reference signal resources corresponding to an uplink element; determining a power parameter associated with the X spatial relationship reference signal resources; and determining a sending power of the uplink element according to the power parameter, where X is a positive integer greater than or equal to 1.

20 Claims, 6 Drawing Sheets

Determine X spatial relationship reference signal resources corresponding to an uplink element — 100

Determine a power parameter associated with the X spatial relationship reference signal resources — 110

Determine a sending power of the uplink element according to the power parameter — 120

(58) Field of Classification Search
　　　CPC . H04W 52/146; H04W 52/367; H04W 52/04;
　　　　　　　　　　　H04W 52/18; H04W 52/283
　　　See application file for complete search history.

(56) References Cited

FOREIGN PATENT DOCUMENTS

| | | | |
|---|---|---|---|
| CN | 110536399 A | 12/2019 | |
| CN | 110859004 A | 3/2020 | |
| CN | 111183594 A | 5/2020 | |
| CN | 111934729 A | 11/2020 | |
| WO | 2019028869 A1 | 2/2019 | |
| WO | 2019197044 A1 | 10/2019 | |
| WO | WO-2020063923 A1 * | 4/2020 | ........... H04B 7/0691 |

OTHER PUBLICATIONS

Extended European Search Report for EP Application No. 21853064.
0, dated Aug. 23, 2024, 12 pages.
Internatonal Search Report mailed Nov. 9, 2021 for Application No.
PCT/CN2021/111389 (four (4) pages).

* cited by examiner

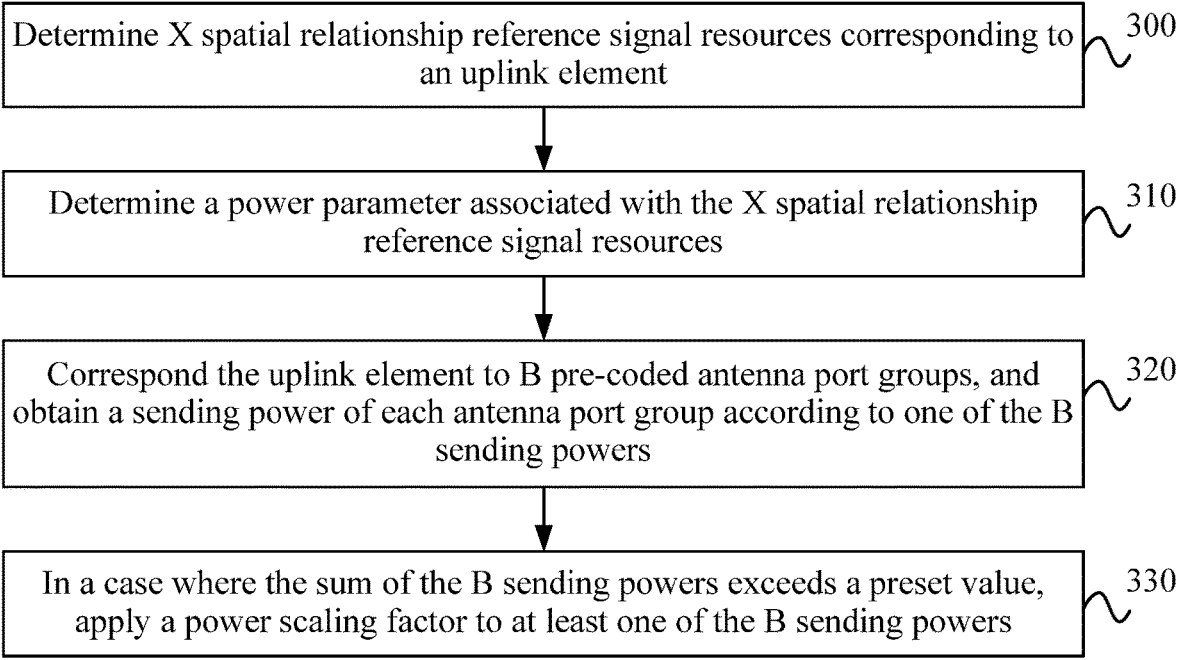

Determine X spatial relationship reference signal resources corresponding to an uplink element ~300

Determine a power parameter associated with the X spatial relationship reference signal resources ~310

Correspond the uplink element to B pre-coded antenna port groups, and obtain a sending power of each antenna port group according to one of the B sending powers ~320

In a case where the sum of the B sending powers exceeds a preset value, apply a power scaling factor to at least one of the B sending powers ~330

FIG. 3

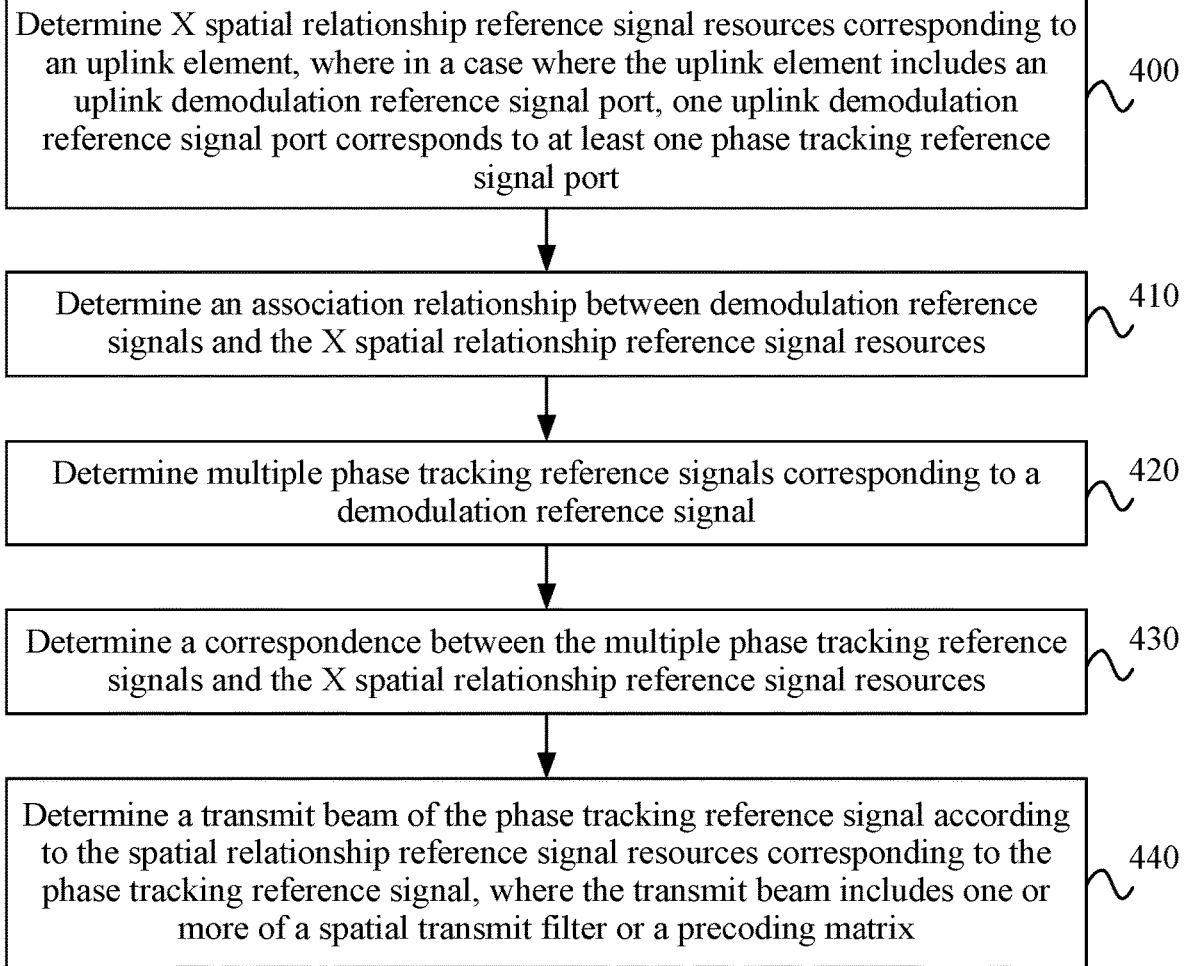

Determine X spatial relationship reference signal resources corresponding to an uplink element, where in a case where the uplink element includes an uplink demodulation reference signal port, one uplink demodulation reference signal port corresponds to at least one phase tracking reference signal port
400

Determine an association relationship between demodulation reference signals and the X spatial relationship reference signal resources
410

Determine multiple phase tracking reference signals corresponding to a demodulation reference signal
420

Determine a correspondence between the multiple phase tracking reference signals and the X spatial relationship reference signal resources
430

Determine a transmit beam of the phase tracking reference signal according to the spatial relationship reference signal resources corresponding to the phase tracking reference signal, where the transmit beam includes one or more of a spatial transmit filter or a precoding matrix
440

FIG. 4

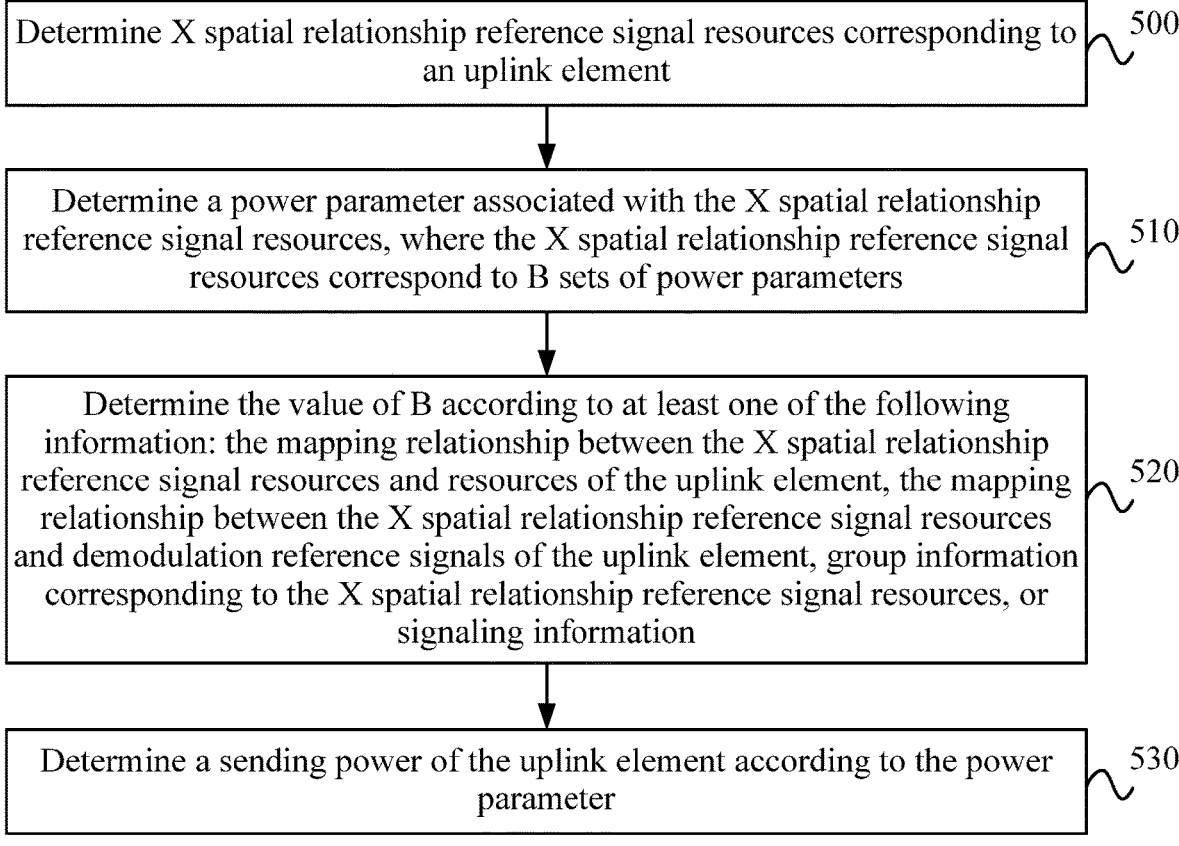

Determine X spatial relationship reference signal resources corresponding to an uplink element ⟋500

Determine a power parameter associated with the X spatial relationship reference signal resources, where the X spatial relationship reference signal resources correspond to B sets of power parameters ⟋510

Determine the value of B according to at least one of the following information: the mapping relationship between the X spatial relationship reference signal resources and resources of the uplink element, the mapping relationship between the X spatial relationship reference signal resources and demodulation reference signals of the uplink element, group information corresponding to the X spatial relationship reference signal resources, or signaling information ⟋520

Determine a sending power of the uplink element according to the power parameter ⟋530

FIG. 5

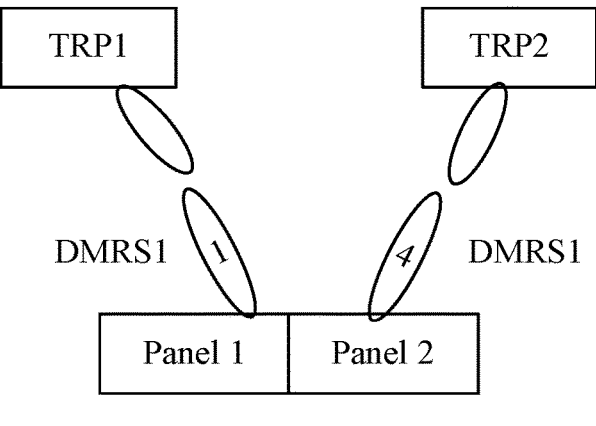

FIG. 6

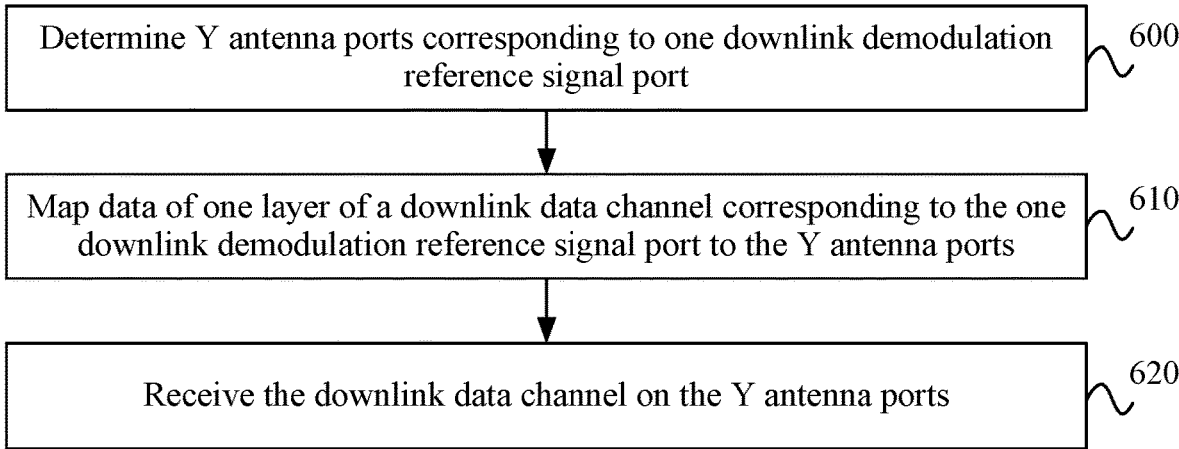

Determine Y antenna ports corresponding to one downlink demodulation reference signal port ⟋600

Map data of one layer of a downlink data channel corresponding to the one downlink demodulation reference signal port to the Y antenna ports ⟋610

Receive the downlink data channel on the Y antenna ports ⟋620

FIG. 7

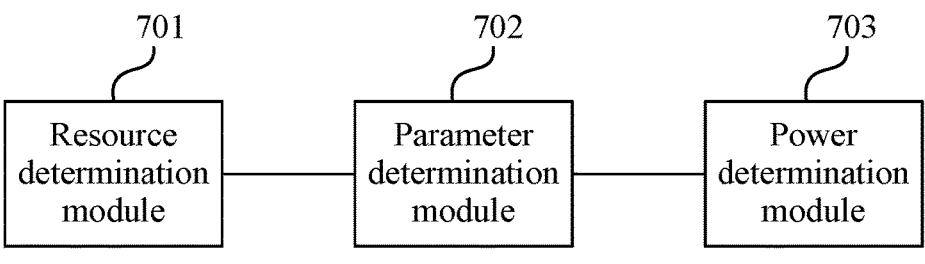

701

702

703

| Resource determination module | Parameter determination module | Power determination module |

FIG. 8

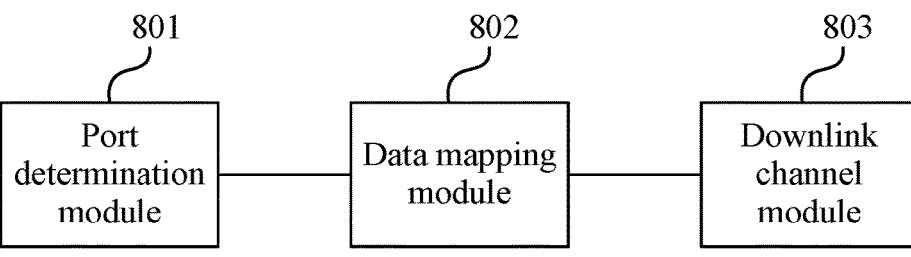

801

802

803

| Port determination module | Data mapping module | Downlink channel module |

FIG. 9

METHOD FOR DETERMINING A SENDING POWER OF AN UPLINK ELEMENT, AND DEVICE

CROSS-REFERENCE TO RELATED APPLICATIONS

This is a National Stage Application, filed under 35 U.S.C. 371, of International Patent Application No. PCT/CN2021/111389, filed on Aug. 9, 2021, which claims priority to Chinese Patent Application No. 202010791625.X filed with the China National Intellectual Property Administration (CNIPA) on Aug. 7, 2020, the disclosures of which are incorporated herein by reference in their entireties.

TECHNICAL FIELD

The present application relates to the field of wireless communications, for example, a method for determining a sending power of an uplink element, and a device.

BACKGROUND

In beam communications, to improve the robustness of a communication link, multiple transmit beams are often used to repeatedly send the same data. At this point, spatial relationship reference information of a first channel sounding reference signal (SRS) resource includes multiple SRS resources. A spatial transmit filter of the first SRS resource is determined through multiple SRS resources, each uplink demodulation reference signal (DMRS) port corresponds to one first SRS resource, and parameters of the uplink DMRS port are obtained through the first SRS resource. A first SRS is sent as an intermediate transition before the DMRS of a physical uplink shared channel (PUSCH), increasing a sending load of an SRS. In another method, different transmit beams correspond to different DMRS ports, but the DMRS load is increased. How to reduce the DMRS load as well as the sending load of a terminal on the basis of guaranteeing the robustness of the communication link becomes the focus of industry research. Similarly, for downlink, in order to repeatedly send the same data using multiple transmit beams, multiple DMRS ports are used, and different DMRS ports correspond to different transmission configuration indication (TCI) states. However, at this point, the DMRS load is increased, and one DMRS port corresponds to multiple TCI states. Therefore, a quasi co-location (QCL) relationship and a mapping relationship from layers to DMRS ports become a research focus.

SUMMARY

Embodiments of the present application provide a method and apparatus for determining a sending power of an uplink element, a device and a storage medium to increase the robustness of a communication link and reduce a DMRS load and a sending load of a terminal.

The embodiments of the present application provide a method for determining a sending power of an uplink element. The method includes the following: X spatial relationship reference signal resources corresponding to an uplink element are determined; a power parameter associated with the X spatial relationship reference signal resources is determined; and a sending power of the uplink element is determined according to the power parameter; where X is a positive integer greater than or equal to 1.

The embodiments of the present application further provide a method for determining an antenna port. The method includes the following: Y antenna ports corresponding to one downlink demodulation reference signal port are determined, where Y is a positive integer greater than 1; data of one layer of downlink data channel corresponding to the one downlink DMRS port is mapped to the Y antenna ports; and the downlink data channel is received on the Y antenna ports.

The embodiments of the present application further provide a device. The device includes one or more processors, and the one or more processors are configured to, when executed, implement the method for determining a sending power of an uplink element or the method for determining an antenna port in any of the embodiments of the present application.

The embodiments of the present application further provide a computer-readable storage medium. The computer-readable storage medium is configured to store a computer program, and the program, when executed by a processor, implements the method for determining a sending power of an uplink element or the method for determining an antenna port in any of the embodiments of the present application.

BRIEF DESCRIPTION OF DRAWINGS

FIG. 3 is another flowchart of a method for determining a sending power of an uplink element according to an embodiment of the present application;

FIG. 4 is another flowchart of a method for determining a sending power of an uplink element according to an embodiment of the present application;

FIG. 5 is another flowchart of a method for determining a sending power of an uplink element according to an embodiment of the present application;

FIG. 6 is an example diagram of data sending based on SRS resources according to an embodiment of the present application;

FIG. 7 is a flowchart of a method for determining an antenna port according to an embodiment of the present application;

FIG. 8 is a structure diagram of an apparatus for determining a sending power of an uplink element according to an embodiment of the present application;

FIG. 9 is a structure diagram of an apparatus for determining an antenna port according to an embodiment of the present application.

DETAILED DESCRIPTION

Embodiments of the present application are described hereinafter in detail in conjunction with drawings.

Figure 1:
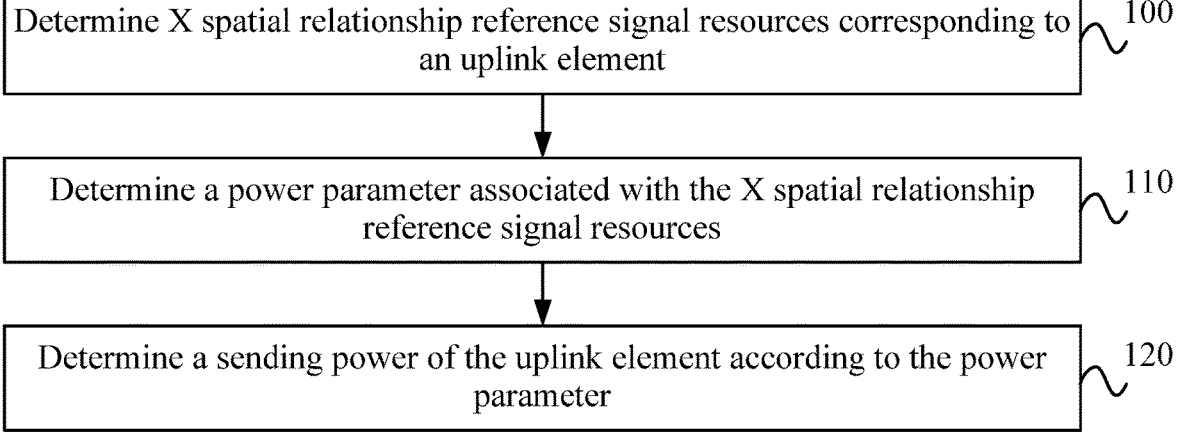
FIG. 1 is a flowchart of a method for determining a sending power of an uplink element according to an embodiment of the present application.

FIG. 1 is a flowchart of a method for determining a sending power of an uplink element according to an embodiment of the present application. This embodiment of the present application is applicable to the case where multiple beams repeatedly send the same data. The method may be performed by an apparatus for determining a sending power of an uplink element in the embodiments of the present application, and the apparatus may be implemented by software and/or hardware. The method in this embodiment of the present application includes the following.

In operation 100, X spatial relationship reference signal resources corresponding to an uplink element are determined.

The uplink element may be an element sent in an uplink direction. For example, the uplink element may include an uplink demodulation reference signal port and/or an uplink channel A transmit beam of the uplink element is obtained according to the spatial relationship reference signal resources. The spatial relationship reference signal resources include one or more of the following: SRS resources, channel state information-reference signal (CSI-RS) resources, or synchronization signal block (SSB) resources.

In the embodiments of the present application, to improve the robustness of the communication link, the same data is repeatedly sent using multiple transmit beams. At this point, the uplink element has a correspondence with multiple spatial relationship reference signal resources, and multiple spatial relationship reference signal resources corresponding to one uplink element are determined.

For example, on the basis of the preceding embodiment, the uplink element includes at least one of an uplink reference signal port or an uplink channel.

In operation 110, a power parameter associated with the X spatial relationship reference signal resources is determined.

For example, the spatial relationship reference signal resources have a correspondence with power parameters. The correspondence includes the following: each spatial relationship reference signal resource corresponds to one set of power parameters, respectively, where one set of power parameters includes one or more power parameters, and one sending power is obtained according to each set of power parameters and a predetermined formula; the X spatial relationship reference signal resources collectively correspond to one set of power parameters; or one spatial relationship reference signal resource group in the X spatial relationship reference signal resources corresponds to one set of power parameters, where the number of sets of power parameters corresponding to the X spatial relationships reference signal resources is the same as the number of spatial relationship reference signal resource groups included in the X spatial relationships reference signal resources, or X is an integer multiple of the number of spatial relationship reference signal resource groups.

In operation 120, a sending power of the uplink element is determined according to the power parameter, where X is a positive integer greater than or equal to 1.

In the embodiments of the present application, the sending power of the uplink element is determined according to the determined power parameter, and the uplink element corresponds to one or more sets of power parameters. When the sending power of the uplink element is determined, and the uplink element corresponds to one set of power parameters, the sending power is obtained according to this one set of power parameters; and when the uplink element corresponds to multiple sets of power parameters, the sending power is obtained according to the multiple sets of power parameters. For example, multiple sending powers corresponding to multiple sets of power parameters are determined, and an average value of the multiple sending powers is taken as the sending power of the uplink element; or the maximum value of the multiple sending powers is taken as the sending power of the uplink element; or the minimum value of the multiple sending powers is taken as the sending power of the uplink element; or the multiple sending powers correspond to different transmit antenna port groups of the uplink element, respectively. Alternatively, one sending power may be determined according to each set of multiple sets of sending power parameters, and different sending powers may be used on different SRS resources. For example, when one DMRS port of one PUSCH is associated with uplink SRS resource 1 and SRS resource 4, the PUSCH corresponds to power parameter 1 of the SRS resource 1 and power parameter 4 of the SRS resource 4, and the PUSCH uses a sending power obtained according to the power parameter 1 on the SRS resource 1 and uses a sending power obtained according to the power parameter 4 on the SRS resource 4.

In the embodiments of the present application, X spatial relationship reference signal resources corresponding to an uplink element are determined, a power parameter associated with the X spatial relationship reference signal resources is determined, and a sending power of the uplink element is determined according to the power parameter, thereby accurately determining the sending power, reducing the sending load of the terminal, and enhancing the robustness of the communication link, where determining the sending power of the uplink element according to the power parameter includes obtaining the sending power of the uplink element according to the power parameter and a predetermined formula.

For example, on the basis of the preceding embodiments of the present application, the uplink element includes at least one of an uplink reference signal port or an uplink channel.

For example, on the basis of the preceding embodiments of the present application, determining the power parameter associated with the X spatial relationship reference signal resources includes corresponding the X spatial relationship reference signal resources to B sets of power parameters, where B is a positive integer.

For example, when the X spatial relationship reference signal resources correspond to one set of power parameters, B is 1; alternatively, when the X spatial relationship reference signal resources respectively correspond to different power parameters, the value of B is the same as the value of X; alternatively, when one part of the X spatial relationship reference signal resources correspond to one set of power parameters, and the other part of the X spatial relationship reference signal resources correspond to another set of power parameters, the value of B is greater than 1 and less than the value of X.

Figure 2:
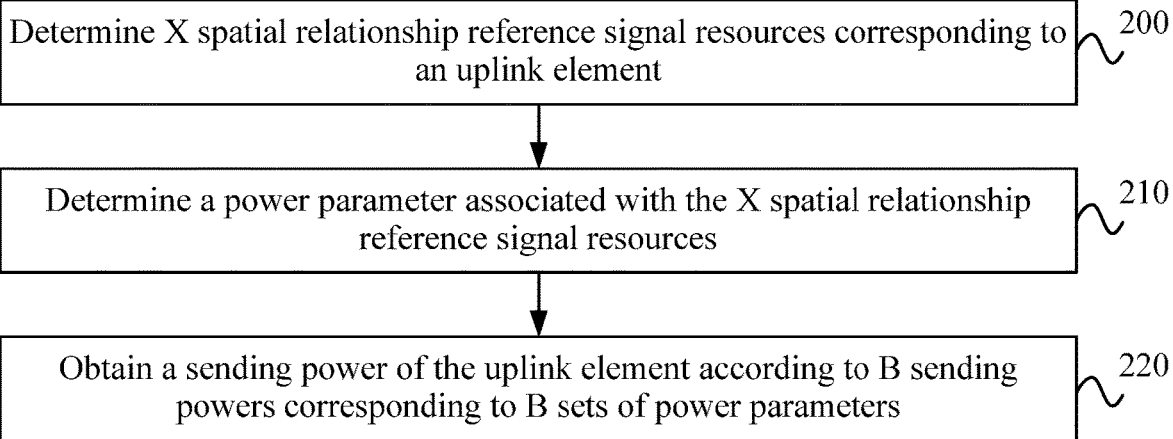
FIG. 2 is another flowchart of a method for determining a sending power of an uplink element according to an embodiment of the present application.

FIG. 2 is another flowchart of a method for determining a sending power of an uplink element according to an embodiment of the present application. This embodiment of the present application is a refinement on the basis of the preceding embodiments of the present application. With reference to FIG. 2, the method provided in this embodiment of the present application includes the following.

In operation 200, X spatial relationship reference signal resources corresponding to an uplink element are determined.

In operation 210, a power parameter associated with the X spatial relationship reference signal resources is determined.

In operation 220, a sending power of the uplink element is obtained according to B sending powers corresponding to B sets of power parameters.

For example, the uplink element corresponds to the B sets of power parameters. When B is 1, the uplink element corresponds to one set of power parameters, and the sending power of the uplink element is determined according to the one set of power parameters and a predetermined formula. When B is greater than 1, the uplink element corresponds to multiple sets of power parameters, and the sending power of the uplink element is determined jointly according to the multiple sets of power parameters. For example, one sending power is obtained according to each set of power parameters and the predetermined formula, and one of the average value, the maximum value, or the minimum value of multiple sending powers is taken as the sending power of the uplink element. In another example, the B sending powers may be all taken as the sending power of the uplink element, on a first resource of the uplink element, the sending power is obtained by using a power parameter corresponding to the first resource; and on a second resource of the uplink element, the sending power is obtained by using a power parameter corresponding to the second resource.

In an example embodiment, when the uplink element corresponds to multiple sets of power parameters, each set of power parameters corresponds to a respective sending power, the maximum value, the minimum value, or the average value of sending powers is determined, and at least one of the determined maximum value, the determined minimum value or the determined average value is taken as the sending power of the uplink element.

For example, on the basis of the preceding embodiments of the present application, obtaining the sending power of the uplink element according to the B sending powers corresponding to the B sets of power parameters includes the following: the uplink element corresponds to B antenna port groups after precoding, and a sending power of each antenna port group is obtained according to one of the B sending powers, where each antenna port group includes at least one antenna port.

The antenna port group is an antenna array sending the uplink element, the antenna port group includes one or more antenna ports, and multiple antenna ports in one antenna port group correspond to the same one sending power.

In an example embodiment, the uplink element corresponds to multiple antenna port groups after precoding, each antenna port group corresponds to one of the B sending powers, and different antenna port groups correspond to different sending powers.

FIG. 3 is another flowchart of a method for determining a sending power of an uplink element according to an embodiment of the present application. This embodiment of the present application is a refinement on the basis of the preceding embodiments. With reference to FIG. 3, the method provided in this embodiment of the present application includes the following.

In operation 300, X spatial relationship reference signal resources corresponding to an uplink element are determined.

In step 310, a power parameter associated with the X spatial relationship reference signal resources is determined.

In operation 320, the uplink element corresponds to B antenna port groups after precoding, and the sending power of each antenna port group is obtained according to one of B sending powers.

In operation 330, in a case where the sum of the B sending powers exceeds a preset value, a power scaling factor is applied to at least one of the B sending powers.

The preset value is the maximum power of the sending powers, and the preset value is determined by a base station and/or a terminal.

On the basis of embodiments of the present application, when the sending power of the uplink element is determined by the sending powers of multiple sets of power parameters, if the power sum of the sending powers corresponding to the multiple sets of power parameters is greater than the preset value, the sending power of the uplink element may be the upper power limit of the terminal, and thus the sending power of each set of power parameters is reduced through the power scaling factor, where the power scaling factor is preset by a system, it can be understood that the power scaling factor may be applied to each of the B sending powers, respectively, or that the power scaling factor may be applied to one or several certain of the B sending powers.

For example, on the basis of the preceding embodiments of the present application, obtaining the sending power of each antenna port group according to one of the B sending powers includes the following: the sending power of each antenna port group is obtained according to a correspondence between the B antenna port groups and the B sets of power parameters determined according to signaling information.

In an example embodiment, the correspondence between antenna port groups and sending powers corresponding to the power parameters is determined through the signaling information. For example, it is determined through the signaling information that the antenna port groups and power parameters are in a one-to-one correspondence, or that all antenna port groups collectively correspond to one set of power parameters, or that one or more of the antenna port groups collectively correspond to one set of power parameters and the remaining other antenna port groups correspond to different sets of power parameters, respectively.

For example, on the basis of the preceding embodiments of the present application, obtaining the sending power of each antenna port group according to one of the B sending powers includes the following: each of the X spatial relationship reference signal resources corresponds to one set of power parameters, respectively, and/or, the value of X is the same as the value of B.

In an example embodiment, when the sending power of each antenna port group is obtained according to one of the B sending powers, the X spatial relationship reference signal resources correspond to one set of power parameters, respectively, and different spatial relationship reference signal resources may correspond to different power parameters. For example, at this point, the value of X is the same as the value of B.

FIG. 4 is another flowchart of a method for determining a sending power of an uplink element according to an embodiment of the present application. This embodiment of the present application is a refinement on the basis of the preceding embodiments of the present application. With reference to FIG. 4, the method provided in this embodiment of the present application includes the following.

In operation 400, X spatial relationship reference signal resources corresponding to an uplink element are determined, where in a case where the uplink element includes an uplink DMRS port, one uplink DMRS port corresponds to at least one phase tracking reference signal (PTRS) port.

In an example embodiment, the uplink element includes an uplink DMRS port, and the DMRS port may correspond to multiple PTRS ports.

In operation 410, an association relationship between demodulation reference signals and the X spatial relationship reference signal resources is determined.

In operation 420, multiple phase tracking reference signals corresponding to a demodulation reference signal are determined.

In operation 430, a correspondence between the multiple phase tracking reference signals and the X spatial relationship reference signal resources is determined.

In operation 440, a transmit beam of a phase tracking reference signal is determined according to the spatial relationship reference signal resource corresponding to the phase tracking reference signal, where the transmit beam includes one or more of a spatial transmit filter or a precoding matrix.

For example, on the basis of the preceding embodiments of the present application, in a case where the one uplink demodulation reference signal port corresponds to more than one phase tracking reference signal port, a frequency domain resource occupied by each of the more than one phase tracking reference signal port is obtained according to the one uplink demodulation reference signal port; and a transmit beam of each of the more than one phase tracking reference signal port is obtained according to one of the X spatial relationship reference signal resources corresponding to the one uplink demodulation reference signal port.

For example, in a case where one DMRS port corresponds to at least one PTRS port, the frequency domain resource occupied by each PTRS port may be obtained by the DMRS port, and the transmit beam of each PTRS port may be obtained by one of the X spatial relationship reference signal resources corresponding to the corresponding DMRS port.

FIG. 5 is another flowchart of a method for determining a sending power of an uplink element according to an embodiment of the present application. This embodiment of the present application is a refinement on the basis of the preceding embodiments. With reference to FIG. 5, the method provided in this embodiment of the present application includes the following.

In operation 500, X spatial relationship reference signal resources corresponding to an uplink element are determined.

In operation 510, a power parameter associated with the X spatial relationship reference signal resources is determined, and the X spatial relationship reference signal resources correspond to B sets of power parameters, where B is a positive integer.

In operation 520, the value of B is determined according to at least one of the following information: a mapping relationship between the X spatial relationship reference signal resources and resources of the uplink element, a mapping relationship between the X spatial relationship reference signal resources and demodulation reference signals of the uplink element, group information corresponding to the X spatial relationship reference signal resources or signaling information.

In the embodiments of the present application, the number of sets of power parameters corresponding to the X spatial relationships reference signal resources is determined through the following relationships: the mapping relationship between the spatial relationship reference signal resources and the resources of the uplink element, the mapping relationship between the spatial relationship reference signal resources and the demodulation reference signals of the uplink element, group information corresponding to each spatial relationship reference signal resource, signaling information, and so on.

In operation 530, a sending power of the uplink element is determined according to the power parameter, where X is a positive integer greater than or equal to 1.

For example, on the basis of the preceding embodiments of the present application, determining the value of B according to the mapping relationship between the X spatial relationship reference signal resources and the resources of the uplink element includes at least one of the following:

In a case where the X spatial relationship reference signal resources correspond to the same one resource of the uplink element, the value of B is equal to 1; or in a case where the X spatial relationship reference signal resources correspond to different resources of the uplink element, respectively, the value of B is greater than 1.

In an example embodiment, the correspondence between the spatial relationship reference signal resources and the resources of the uplink element is determined, when the X spatial relationship reference signal resources correspond to the same resource of the uplink element, the value of B is 1, accordingly, the X spatial relationship reference signal resources collectively correspond to one set of power parameters; and when the X spatial relationship reference signal resources correspond to different resources of the uplink element, the value of B is greater than 1, and accordingly, the X spatial relationship reference signal resources correspond to one set of power parameters, respectively, or each spatial relationship reference signal resource group in the X spatial relationship reference signal resources corresponds to one set of power parameters, respectively.

For example, on the basis of the preceding embodiments of the present application, determining the value of B according to the mapping relationship between the X spatial relationship reference signal resources and the demodulation reference signals of the uplink element includes at least one of the following:

In a case where the X spatial relationship reference signal resources correspond to different demodulation reference signal ports of the uplink element, respectively, the value of B is equal to 1; or in a case where the X spatial relationship reference signal resources correspond to the same demodulation reference signal port of the uplink element, the value of B is greater than 1.

In an example embodiment, the correspondence between the spatial relationship reference signal resources and the demodulation reference signal ports of the uplink element may be determined to determine the value of B. When the X spatial relationship reference signal resources correspond to different DMRS ports and a DMRS port corresponding to each spatial relationship reference signal resource is different, the value of B may be 1 at this point, and the X spatial relationship reference signal resources collectively correspond to one set of power parameters. When the X spatial relationship reference signal resources correspond to the same DMRS port, the value of B may be greater than 1, and accordingly, the X spatial relationship reference signal resources may respectively correspond to one set of power parameters, or each spatial relationship reference signal resource group in the X spatial relationship reference signal resources corresponds to one set of power parameters, respectively.

For example, on the basis of the preceding embodiments of the present application, determining the value of B according to the group information corresponding to the X spatial relationship reference signal resources includes at least one of the following:

In a case where the X spatial relationship reference signal resources correspond to the same group information, the value of B is equal to 1; in a case where the X spatial relationship reference signal resources correspond to different group information, the value of B is greater than 1; spatial relationship reference signal resources corresponding to the same group information in the X spatial relationship reference signal resources are determined to correspond to the same one set of power parameters; spatial relationship reference signal resources corresponding to the same group information in the X spatial relationship reference signal resources are determined to correspond to different sets of power parameters; or the value of B is equal to the number of pieces of the group information corresponding to the X spatial relationship reference signal resources.

The group information includes one of the following: a spatial relationship reference signal resource group; received signaling information, where the signaling information includes spatial relationship reference signal resources included in one spatial relationship reference signal resource group; or a control channel resource group corresponding to a spatial relationship reference signal resource, where spatial relationship reference signal resources corresponding to the same control channel resource group correspond to the same group information.

In another example embodiment, the correspondence between the spatial relationship reference signal resources and the group information is determined, when the group information corresponding to the X spatial relationship reference signal resources is the same, the value of B is 1, and the X spatial relationship reference signal resources collectively correspond to one set of power parameters; and when the X spatial relationship reference signal resources correspond to different group information, the value of B is greater than 1, and the X spatial relationship reference signal resources correspond to multiple sets of power parameters. For example, the value of B represents the number of pieces of the group information corresponding to the X spatial relationship reference signal resources. When the value of B is 1, the X spatial relationship reference signal resources correspond to one piece of group information. When the value of B is greater than 1, the X spatial relationship reference signal resources correspond to B pieces of group information.

For example, on the basis of the preceding embodiments of the present application, in a case where the value of B is greater than 1, the method further includes the following:

In a case where the value of B is equal to the value of X, each spatial relationship reference signal resource corresponds to one set of power parameters, respectively; or in a case where the value of B is less than the value of X, each spatial relationship reference signal resource group corresponds to one set of power parameters, respectively, where each spatial relationship reference signal resource group includes at least one spatial relationship reference signal resource.

For example, on the basis of the preceding embodiments of the present application, the X spatial relationship reference signal resources corresponding to the uplink element include at least one of the following.

The uplink element corresponds to the X spatial relationship reference signal resources on the same resource; the uplink element corresponds to the X spatial relationship reference signal resources on C resources, where each resource corresponds to at least one of the X spatial relationship reference signal resources, and C is a positive integer; or in a case where the uplink element includes the uplink channel, each demodulation reference signal port of the uplink element corresponds to B spatial relationship reference signal resources in the X spatial relationship reference signal resources, respectively.

For example, on the basis of the preceding embodiments of the present application, determining the X spatial relationship reference signal resources corresponding to the uplink element includes at least one of the following:

Spatial information of the uplink element is obtained according to the X spatial relationship reference signal resources, where the spatial information includes at least one of a spatial transmit filter or uplink transmit precoding.

For example, on the basis of the preceding embodiments of the present application, the spatial relationship reference signal resources include at least one of the following channel SRS resources, CSI-RS resources, or synchronization signal block (SSB) resources.

For example, on the basis of the preceding embodiments of the present application, the power parameter includes at least one of the following: a power parameter of the uplink element, a target receiving power parameter, a path loss reference signal resource, a path loss compensation factor or a closed-loop power control index.

In an example embodiment, the DMRS port of one PUSCH corresponds to X spatial relationship reference signal resources on the same resource resource element (RE), where X is a positive integer greater than or equal to 1, the PUSCH may be sent in a single frequency network (SFN) manner, and the spatial relationship reference signal resource includes at least one of the following: an SRS resource, a CSI-RS resource or an SSB resource. The spatial transmit filter or the uplink transmit precoding of the DMRS port of the PUSCH may be obtained through the spatial relationship reference signal resources. For example, when the spatial relationship reference signal resources are SRS resources, each SRS resource may be associated with one set of power parameters, and the power of the DMRS port is determined based on the power parameters of the X SRS resources.

For example, FIG. 6 is an example diagram of data sending based on SRS resources according to an embodiment of the present application. With reference to FIG. 6, one DMRS port of one PUSCH is associated with two SRS resources {SRS resource 1 and SRS resource 4}. Each SRS resource may include one SRS port, and each SRS resource corresponds to one set of power parameters, respectively. The sending power of DMRS1 of the PUSCH is obtained based on synthesizing two sets of power parameters corresponding to {SRS resource 1 and SRS resource 4}. For example, a sending power is obtained based on each set of power parameters and the predetermined formula, respectively, and then one of the maximum value, the minimum value or the average value of two sending powers is taken as the sending power of the PUSCH. The two SRS resources may belong to one SRS set for non-codebook. The mapping formula of the number of layers to transmit antenna ports may be shown in Formula (1):

$$
\begin{bmatrix} y^{(p_0)}(i) \\ \vdots \\ y^{(p_{v-1})}(i) \end{bmatrix} = w \begin{bmatrix} x^{(0)}(i) \\ \vdots \\ x^{(v-1)}(i) \end{bmatrix}. \tag{1}
$$

In Formula (1), w may be a lower triangular matrix and $y^{(j)}(i)$ represent pre-coded data on antenna ports, in which each column has one or more elements with the value of 1. For example, only one element with the value of 1 is on each row, that is, only one DMRS port is transmitted on one SRS resource. At this point, the DMRS port may correspond to one sending power on the same resource RE. $[p_0, p_0, \ldots, p_{v-1}]$ represents serial numbers of DMRS ports of the PUSCH. For example, $[p_0, p_0, \ldots, p_{v-1}]$ belongs to $[0, 1, \ldots, 7, \ldots, 11]$. After precoding, a terminal maps $y^{(p_j)}(i)$ after multiplying the power to a physical resource block (PRB) resource and transmits the PUSCH to a base station on antenna ports $[p_0, \; p_0, \; \ldots, \; p_{v-1}]$, where $\forall j \in 0, 1, \ldots, v-1$, and $x^j(i)$ may be data of a $j^{th}$ layer of the PUSCH.

Alternatively, for the sending power of the DMRS1 of the PUSCH, two sending powers are obtained in total based on one sending power corresponding to each set of power parameters corresponding to {SRS resource 1 and SRS resource 4}, and then the DMRS port 1 is sent respectively on the SRS resource 1 and the SRS resource 4 using the corresponding powers. Since the DMRS1 is sent on the same RE through the transmit beams corresponding to the SRS resource 1 and the SRS resource 4, the sum of the sending powers respectively obtained according to the SRS resource 1 and the SRS resource 4 may exceed the maximum sending power of the terminal. When the sum of the two sending powers is greater than a predetermined value, one power scaling factor needs to be applied to each sending power or one of the two sending powers. At this point, one DMRS corresponds to two sending powers on the same RE. In this manner, the mapping formula of layers to transmit antenna ports may be shown in Formula (1-1):

$$
\begin{bmatrix}
y^{(p_{00})}(i) \\
y^{(p_{01})}(i) \\
\vdots \\
y^{(p_{0(A-1)})}(i) \\
\vdots \\
y^{(p_{(v-1)0})}(i) \\
y^{(p_{(v-1)1})}(i) \\
\vdots \\
y^{(p_{(v-1)(A-)})}(i)
\end{bmatrix}
= w
\begin{bmatrix}
x^{(0)}(i) \\
\vdots \\
x^{(v-1)}(i)
\end{bmatrix}.
\tag{1-1}
$$

In Formula (1-1), $p_{ij}$ may be an SRS antenna port included in a $j^{th}$ SRS resource in the X SRS resources corresponding to an $i^{th}$ DMRS port, each SRS resource includes one antenna port, and antenna ports of the X SRS resources are sequentially numbered. Different DMRS ports in Formula (1-1) correspond to different X SRS resources. In another implementation of this embodiment, one DMRS port group corresponds to the same A SRS resources, and different DMRS port groups correspond to different A SRS resources. The sending power of $p_{ij}$ is obtained according to a power parameter corresponding to the $j^{th}$ SRS resource in the X SRS resources corresponding to the $i^{th}$ DMRS port, where the power parameter is the power parameter of the PUSCH. The serial numbers of antenna ports on the left of the equal sign in Formula (1-1) are obtained by first in increasing order of the resource indexes of the X SRS resources corresponding to the DMRS port group, and then in increasing order of the DMRS port groups. In Formula (1-1), in an $i^{th}$ column of w, elements from an $((i-1)X+1)^{th}$ element to an $(i*X+1)^{th}$ element are 1 while the remaining elements are 0.

In the embodiments of the present application, one code-point in an SRS resource indicator (SRI) indication field corresponds to N SRS resources, X SRS resources in the N SRS resources correspond to the same DMRS port, and the parameter of the DMRS is obtained according to A SRS resources on the same resource RE, where the parameter of the PUSCH or the DMRS includes one of a transmit spatial filter or a power parameter. N is a positive integer greater than or equal to 1, and A is a positive integer less than or equal to N, or N is an integer multiple of A, for example, if there are D DMRS ports, N=D*A.

Similarly, the preceding method is also applicable to the case where one PTRS port corresponds to multiple spatial relationship reference signal resources on the same resource RE. The spatial transmit filter of the PTRS is obtained according to the multiple spatial relationship reference signal resources. Alternatively, the PTRS port corresponds to the DMRS port, the PTRS port and the DMRS port correspond to the same multiple spatial relationship reference signal resources, one DMRS port corresponds to one PTRS port, and resources RE occupied by the PTRS port are obtained according to the DMRS port.

Alternatively, when one DMRS port corresponds to A spatial relationship reference signal resources, one PTRS port corresponds to one of the A spatial relationship reference signal resources corresponding to the DMRS port, where the precoding of the PTRS is obtained according to one spatial relationship reference signal resource, and the power parameter of the PTRS is also obtained according to a power parameter associated with the spatial relationship reference signal resource. The resource RE occupied by the PTRS is obtained according to the DMRS port. One DMRS port corresponds to one or more PTRS ports. One DMRS port corresponds to one or more PTRS ports on the same resource. One DMRS port corresponds to A spatial relationship reference signal resources on each time-frequency resource, and one DMRS port corresponds to one or more PTRS ports. The power parameter includes at least one of: a power parameter of a DMRS, a target receiving power, a path loss reference signal resource, a path loss compensation factor or a closed-loop power control index (CloseLoopIndex).

In an example embodiment, one DMRS port of the PUSCH corresponds to A spatial relationship reference signal resources, where the spatial relationship reference signal resource includes at least one of the following: an SRS resource, a CSI-RS resource or an SSB resource. The spatial transmit filter of the DMRS port is obtained according to the spatial relationship reference signal resources, and the following is described by using an example where the spatial relationship reference signal resource is the SRS resource. One DMRS port of the PUSCH corresponds to A SRS resources, where A is a positive integer greater than or equal to 1. At this point, whether the A SRS resources correspond to one set of power parameters, respectively or the A SRS resources correspond to one set of power parameters is acquired according to the following information: the mapping relationship between the A SRS resources and resources of one DMRS of the PUSCH, where the resources include at least one of: time domain resources, frequency domain resources or time-frequency resources. The transmit spatial filtering parameter of the DMRS port is obtained according to multiple SRS resources.

When one DMRS port corresponds to A SRS resources and the A SRS resources correspond to different resources of the one DMRS port, the A SRS resources correspond to one set of power parameters, respectively, and for the one DMRS port, the spatial transmit filter and the sending power of this DMRS port on different resources are obtained according to SRS resources corresponding to the respective resource, where the sending power is obtained according to a power parameter associated with the SRS resources corresponding to the respective resource.

When one DMRS port corresponds to A SRS resources and the A SRS resources correspond to the same resource of the one DMRS port, the A SRS resources correspond to the same set of power parameters, the spatial transmit filtering parameter of the DMRS port on each resource of the DMRS port is obtained according to the A SRS resources, and the sending power of the DMRS port on the resource RE is obtained according to the set of power parameters corresponding to the A SRS resources.

Similarly, the preceding method is also applicable to the case where one PTRS port corresponds to A spatial relationship reference signal resources.

In an example embodiment, one PUSCH corresponds to N spatial relationship reference signal resources, and the spatial relationship reference signal resources include at least one of the following: SRS resources, CSI-RS resources or SSB resources. The spatial transmit filter of the DMRS port is obtained according to the spatial relationship reference signal resources, and the following is described by using an example where the spatial relationship reference signal resources are the SRS resources. N is a positive integer greater than or equal to 1.

For example, one PUSCH corresponds to N SRS resources. At this point, whether more than one SRS resource in the N SRS resources corresponds to one set of power parameters respectively or each of the N SRS resources corresponds to one set of power parameters, respectively is acquired according to at least one of the following information: whether DMRS ports of the PUSCH corresponding to the N SRS resources are the same or whether time domain resources of the PUSCH corresponding to the N SRS resources are the same. The power parameter is the power parameter of the PUSCH. The time domain resource of the PUSCH corresponding to the SRS resources comprises that in the time domain resources, parameters of the PUSCH are obtained according to the SRS resources. The DMRS port of the PUSCH corresponding to the SRS resources includes that parameters of the DMRS port of the PUSCH are obtained according to the SRS resources. The parameter of the PUSCH includes one or more of a spatial transmit filter of the PUSCH or a power parameter of the PUSCH. For example, when DMRS ports of the PUSCH corresponding to the N SRS resources are different, the N SRS resources correspond to one set of power parameters of the PUSCH; otherwise, when the DMRS ports of the PUSCH corresponding to the N SRS resources are the same, each of the N SRS resources corresponds to one set of power parameters of the PUSCH, respectively. In another example, when the time domain resources of the PUSCH corresponding to the N SRS resources are the same, the N SRS resources correspond to one set of power parameters of the PUSCH; otherwise, when the time domain resources of the PUSCH corresponding to the N SRS resources are different, each of the N SRS resources corresponds to one set of power parameters of the PUSCH, respectively.

In an example embodiment, one PUSCH corresponds to N spatial relationship reference signal resources, and the spatial relationship reference signal resources include at least one of the following: SRS resources, CSI-RS resources or SSB resources. The spatial transmit filter of the DMRS port is obtained according to the spatial relationship reference signal resources, and the following is described by using an example where the spatial relationship reference signal resources are the SRS resources. N is a positive integer greater than or equal to 1.

For example, one PUSCH corresponds to N SRS resources. At this point, whether each of the N SRS resources corresponds to one set of power parameters of the PUSCH, respectively or the N SRS resources correspond to one set of power parameters of the PUSCH is acquired according to the following information: signaling information and/or group information corresponding to the N SRS resources.

SRS resources corresponding to the same group information which are in the N SRS resources correspond to the same power parameter of the PUSCH, and SRS resources corresponding to different group information which are in the N SRS resources correspond to different power parameters of the PUSCH. The sending power of the PUSCH is acquired according to the power parameters of the PUSCH.

For one PUSCH corresponding to N SRS resources, one of the following conditions needs to be satisfied: one DMRS port corresponds to one SRS resource, different SRS resources in the N SRS resources correspond to different DMRS ports of the PUSCH, respectively, or one DMRS port corresponds to A SRS resources, where A is less than or equal to N.

One PUSCH corresponding to N spatial relationship reference signal resources includes the following: one code-point of the indication field that is in downlink control information (DCI) and indicates the spatial relationship reference signal resources of the PUSCH corresponds to N spatial relationship reference signal resources, where the indication field in the DCI indicating the spatial relationship reference signal resources of the PUSCH may also be referred to as a beam indication field such as an SRI indication field.

Whether the N SRS resources correspond to one set of power parameters of the PUSCH or multiple sets of power parameters of the PUSCH may be determined according to the signaling information.

FIG. 7 is a flowchart of a method for determining an antenna port according to an embodiment of the present application. This embodiment of the present application is applicable to the case where multiple beams repeatedly send the same data. The method may be performed by an apparatus for determining an antenna port in the embodiments of the present application, and the apparatus may be implemented by software and/or hardware. The method in the embodiments of the present application includes the following.

In operation 600, Y antenna ports corresponding to one downlink demodulation reference signal port are determined, where Y is a positive integer greater than 1.

In this embodiment of the present application, the downlink DMRS port may correspond to multiple antenna ports on one resource element.

In operation 610, data on one layer of a downlink data channel corresponding to the one downlink demodulation reference signal port is mapped to the Y antenna ports.

For example, data of the one layer corresponding to the one downlink demodulation reference signal port is mapped to the Y antenna ports.

In operation 620, the downlink data channel is received on the Y antenna ports.

For example, on the basis of the preceding embodiments of the present application, data of the one layer corresponding to the one downlink demodulation reference signal port is repeatedly transmitted on the Y antenna ports.

For example, the downlink DMRS port corresponds to Y antenna ports on one resource element, and data corresponding to the downlink DMRS port is transmitted at least once on the Y antenna ports.

For example, on the basis of the preceding embodiments of the present application, the Y antenna ports include at least one of the following features.

Resource signals corresponding to the Y antenna ports occupy the same resource, where the resource includes at least one of the following: a time-frequency resource, a code domain resource or a sequence resource; the Y antenna ports are antenna ports in a layer-to-antenna port mapping; or each of the Y antenna ports corresponds to one set of quasi co-location reference signal resource sets.

In the embodiments of the present application, the reference signals corresponding to the Y antenna port may occupy one or more of the following: the same time-frequency resource, the same code domain resource or the same sequence resource, the Y antenna ports are antenna ports in the layer-to-antenna port mapping, and a quasi co-location reference signal resource set corresponding to each antenna port may be different. A quasi co-location parameter includes at least one of: a Doppler shift, a Doppler spread, an average delay, a delay spread or a spatial Rx parameter.

For example, on the basis of the preceding embodiments of the present application, the reference signals corresponding to the Y antenna ports occupying the same resource includes the following: the resource occupied by the reference signals corresponding to the Y antenna ports is the same as a resource occupied by the downlink demodulation reference signal port.

For example, the resources occupied by the reference signals corresponding to each antenna port may include, for example, the resources occupied by the downlink demodulation reference signal port.

For example, on the basis of the preceding embodiments of the present application, each of the Y antenna ports corresponding to one set of quasi co-location reference signal resource sets includes the following.

Each of the Y antenna ports corresponds to one TCI state, respectively; one set of quasi co-location reference signal resource sets corresponding to each antenna port is included in the TCI state; or each antenna port and a quasi co-location reference signal in the one set of quasi co-location reference signal resource sets corresponding to the respective antenna port satisfy a quasi co-location relationship.

In the embodiments of the present application, the quasi co-location reference signal resource set corresponding to each antenna port is included in the TCI state corresponding to the respective antenna port, and each antenna port and at least one quasi co-location reference signal in the quasi co-location reference signal resource set corresponding to the respective antenna port satisfy the quasi co-location relationship.

For example, on the basis of the preceding embodiments of the present application, at least one of the following is determined according to signaling information or a preset rule: a power difference between any two antenna ports in the Y antenna ports, or a power difference between each of the Y antenna ports and a physical downlink shared channel (PDSCH).

For example, the power difference between any two antenna ports and the power difference between each antenna port and the PDSCH may be determined according to the signaling information or the preset rule.

For example, on the basis of the preceding embodiments of the present application, the power difference between each of the Y antenna ports and the PDSCH includes a power difference between a demodulation reference signal corresponding to each of the Y antenna ports and a PDSCH corresponding to the respective antenna port.

In the embodiments of the present application, a power difference may be determined by comparing the powers of the DMRS and the PDSCH corresponding to each antenna port, and this power difference may be taken as the power difference between the antenna port and the PDSCH.

For example, on the basis of the preceding embodiments of the present application, the Y antenna ports further include the following: the downlink demodulation reference signal port corresponds to the Y antenna ports, and the Y antenna ports correspond to the same resource of the downlink demodulation reference signal port; and a layer-to-port mapping relationship is determined according to the number of TCI states corresponding to the downlink demodulation reference signal port on the same resource.

For example, the downlink demodulation reference signal port corresponds to multiple antenna ports, and each antenna port corresponds to the same resource. The mapping relationship between the layer for data transmission and ports is determined according to the number of TCI states corresponding to the downlink demodulation reference signal port on the same resource.

In an example embodiment, one DMRS port of a PDSCH corresponds to Y TCI states on the same resource RE, each TCI state includes one or more reference signal resources, and different reference signal resources are associated with different quasi co-location parameters, where the quasi co-location parameter includes at least one of the following: a Doppler shift, a Doppler spread, an average delay, a delay spread, or a spatial Rx parameter. In this manner, the formula of the layer-to-antenna port mapping is shown in Formula (2):

$$
\begin{bmatrix}
y^{(p_0, YTCIstate01)}(t) \\
y^{(p_0, TCIstate02)}(t) \\
\vdots \\
y^{(p_{v-1}, TCIstate\ (v-1)2)}(t)
\end{bmatrix}
= w
\begin{bmatrix}
x^{(0)}(t) \\
\vdots \\
x^{(v-1)}(t)
\end{bmatrix}
\tag{2}
$$

In Formula (2), $p_{i,TCIstateij}$ is a channel part or an antenna port corresponding to a $j^{th}$ TCI state in two TCI states corresponding to an $i^{th}$ DMRS port of the PDSCH, where $\forall i \in \{0, v-1\}$, and $\forall j \in \{1,2\}$. t is an index of the resource RE, and $x^{(i)}(t)$ is data of an $i^{th}$ layer. In Formula (2), w is a lower triangular matrix, and in an $i^{th}$ column, elements from a $(\Sigma_{i=0}^{i-1}T_i+1)^{th}$ element to a $(\Sigma_{i=0}^{i}T_i)^{th}$ element are 1 while the remaining elements are 0, where $T_i$ may be the number of TCI states corresponding to the $i^{th}$ DMRS port. For example, when $v=2$, each DMRS port corresponds to two TCI states, and then Formula (3) below is obtained:

$$
\begin{bmatrix}
y^{(p_0, TCIstate01)}(t) \\
y^{(p_0, TCIstate02)}(t) \\
y^{(p_1, TCIstate11)}(t) \\
y^{(p_1, TCIstate12)}(t)
\end{bmatrix}
=
\begin{bmatrix}
1 & 0 \\
1 & 0 \\
0 & 1 \\
0 & 1
\end{bmatrix}
\begin{bmatrix}
x^{(0)}(t) \\
x^{(1)}(t)
\end{bmatrix}.
\tag{3}
$$

The resource occupied by antenna port $p_{i,TCIstatei1}$ is the same as the resource occupied by antenna port $p_{i,TCIstatei2}$, that is, the resource occupied by the two antenna ports is the resource occupied by DMRS port $p_i$, where $\forall i \in \{0, 1, \ldots, v-1\}$, the resource includes a time-frequency resource, a code domain resource and a sequence resource occupied by the reference signals corresponding to the antenna port. The difference is that the antenna port $p_{i,TCIstatei1}$ and a reference signal in TCI statei1 of the DMRS port $p_i$ satisfy a quasi co location relationship, and the antenna port $p_{i,TCIstatei2}$ and a reference signal in TCI statei2 of the DMRS port $p_i$ satisfy a quasi co-location relationship.

In an embodiment, the base station informs the terminal of (or the base station and the terminal predetermine) one of the following: a power difference between $p_{i,TCIstatei1}$ and $p_{i,TCIstatei2}$; a power difference between a PDSCH and a DMRS port in $p_{i,TCIstatei1}$ channel; a power difference between a PDSCH and a DMRS port in $p_{i,TCIstatei2}$ channel; a power difference between a quasi co-location reference signal in the TCI statei1 and a channel in $p_{i,TCIstatei1}$ channel; or a power difference between a quasi co-location reference signal in the TCI statei2 and a channel in $p_{i,TCIstatei2}$ channel.

In an embodiment, each DMRS port corresponds to two different TCI states, respectively, or multiple DMRS ports all correspond to the same two TCI states, that is, TCIstatei1=TCIstatej1, and TCIstatei2=TCIstatej2. In this manner, Formula (2) is also rewritten to Formula (4) below:

$$\begin{bmatrix} t^{(p_0)}(t) \\ y^{(p_1)}(t) \\ \vdots \\ y^{(p_{\nu-1})}(t) \end{bmatrix} = w \begin{bmatrix} x^{(0)}(t) \\ \vdots \\ x^{(\nu-1)}(t) \end{bmatrix}. \tag{4}$$

At this point, the indexes of antenna ports are obtained according to the serial numbers of the DMRS ports and the relative indexes of TCI states corresponding to the serial numbers of the DMRS ports. For example, the indexes of antenna ports are obtained by incrementing the relative indexes of the TCI states first and then incrementing the serial numbers of the DMRS ports, or incrementing the serial numbers of the DMRS ports first and then incrementing the relative indexes of the TCI states. At this point, in an $i^{th}$ column of w, an $i^{th}$ element and a $(\nu+i)^{th}$ element are 1 while the remaining elements are all 0. The relative index of a TCI state is a relative index of the TCI state among multiple TCI states corresponding to the same DMRS port. For example, when $\nu=2$, each DMRS port corresponds to two TCI states, and accordingly, Formula (5) is as follows:

$$\begin{bmatrix} y^{(p_0,TCIstate01)}(t) \\ y^{(p_0,TCIstate02)}(t) \\ y^{(p_1,TCIstate11)}(t) \\ y^{(p_1,TCIstate12)}(t) \end{bmatrix} = \begin{bmatrix} 1 & 0 \\ 1 & 0 \\ 0 & 1 \\ 0 & 1 \end{bmatrix} \begin{bmatrix} x^{(0)}(t) \\ x^{(1)}(t) \end{bmatrix}. \tag{5}$$

The resource occupied by antenna port $p_{i,TCIstatei1}$ and the resource occupied by antenna port $p_{i,TCIstatei2}$ are the same, that is, the resource occupied by the two antenna ports is the resource occupied by DMRS port $p_i$, where $\forall i \in \{0, 1, \ldots, \nu-1\}$, and the resource includes a time-frequency resource, a code domain resource and a sequence resource occupied by the reference signals corresponding to the antenna port. The difference is that the antenna port $p_{i,TCIstatei1}$ and a reference signal in TCI statei1 of the DMRS port $p_i$ satisfy a quasi co location relationship, and the antenna port $p_{i,TCIstatei2}$ and a reference signal in TCI statei2 of the DMRS port $p_i$ satisfy a quasi co-location relationship. In an embodiment, when one DMRS port corresponds to Y TCI states, in the mapping from layers to antenna ports, whether TCI state information is introduced to the acquisition of the antenna ports is determined according to whether the Y TCI states correspond to the same time-frequency resource of one DMRS port. If the Y TCI states correspond to the same resource RE of one DMRS, that is, the DMRS acquires quasi co-location reference signal resources on the resource RE according to the Y TCI states, the mapping from layers to antenna ports adopts one of Formulas (2) to (5). If each of the Y TCI states respectively corresponds to a different resource of one DMRS, that is, quasi co-location reference signal resources of the DMRS on different resources are acquired according to a TCI state corresponding to the respective resource in the Y TCI states, and the mapping from layers to antenna ports adopts Formula (6) below:

$$\begin{bmatrix} t^{(p_0)}(t) \\ y^{(p_1)}(t) \\ \vdots \\ y^{(p_{\nu-1})}(t) \end{bmatrix} = w \begin{bmatrix} x^{(0)}(t) \\ \vdots \\ x^{(\nu-1)}(t) \end{bmatrix}. \tag{6}$$

In Formula (6), $[p_0, p_0, \ldots, p_{\nu-1}]$ represents the serial numbers of the DMRS ports of the PDSCH, and at this point, the acquired parameter of the serial numbers $[p_0, p_0, \ldots, p_{\nu-1}]$ of the antenna ports does not include the TCI state information corresponding to the DMRS ports.

FIG. 8 is a structure diagram of an apparatus for determining a sending power of an uplink element according to an embodiment of the present application. The apparatus for determining a sending power of an uplink element may perform the method for determining a sending power of an uplink element provided in the embodiments of the present application and has the corresponding functional modules and beneficial effects for executing the method. The apparatus may be implemented by software and/or hardware and includes a resource determination module 701, a parameter determination module 702 and a power determination module 703.

The resource determination module 701 is configured to determine X spatial relationship reference signal resources corresponding to an uplink element.

The parameter determination module 702 is configured to determine a power parameter associated with the X spatial relationship reference signal resources.

The power determination module 703 is configured to determine a sending power of the uplink element according to the power parameter, where X is a positive integer greater than or equal to 1.

In the embodiments of the present application, the resource determination module determines X spatial relationship reference signal resources corresponding to an uplink element, the parameter determination module determines a power parameter associated with the X spatial relationship reference signal resources, and the power determination module determines a sending power of the uplink element according to the power parameter, thereby accurately determining the sending power, reducing the sending load of the terminal, and enhancing the robustness of the communication link.

For example, on the basis of the preceding embodiments of the present application, the uplink element in the resource determination module 701 includes at least one of an uplink reference signal port or an uplink channel.

For example, on the basis of the preceding embodiments of the present application, the parameter determination module 702 is configured to correspond the X spatial relationship reference signal resources to B sets of power parameters, where B is a positive integer.

For example, on the basis of the preceding embodiments of the present application, the power determination module 703 includes a power determination unit configured to obtain the sending power of the uplink element according to B sending powers corresponding to the B sets of power parameters.

For example, on the basis of the preceding embodiments of the present application, the power determination unit includes a multi-power determination unit configured to determine the sending power of the uplink element according to at least one of the maximum value, the minimum value or an average value of the B sending powers.

For example, on the basis of the preceding embodiments of the present application, the power determination module 703 is configured to correspond the uplink element to B antenna port groups after precoding and obtain a sending power of each antenna port group according to one of the B sending powers, where one antenna port group includes at least one antenna port.

For example, on the basis of the preceding embodiments of the present application, the power determination module 703 is further configured to determine a correspondence between the B antenna port groups and the B sending powers according to signaling information to determine the sending power of the uplink element.

For example, on the basis of the preceding embodiments of the present application, the power determination module 703 is further configured to, in a case where the sum of the B sending powers exceeds a preset value, apply a power scaling factor to at least one of the B sending powers.

For example, on the basis of the preceding embodiments of the present application, the power determination module 703 is further configured to correspond each of the X spatial relationship reference signal resources to one set of power parameters, respectively, and/or determine the value of X to be the same as the value of B.

For example, on the basis of the preceding embodiments of the present application, the resource determination module 701 is configured to, in a case where the uplink element includes an uplink demodulation reference signal port, correspond one uplink demodulation reference signal port to at least one phase tracking reference signal port.

For example, on the basis of the preceding embodiments of the present application, the resource determination module 701 is configured to, in a case where the one uplink DMRS port corresponds to more than one phase tracking reference signal port, obtain a frequency domain resource occupied by each of the more than one phase tracking reference signal port according to the one uplink demodulation reference signal port and obtain a transmit beam of each of the more than one phase tracking reference signal port according to one of the X spatial relationship reference signal resources corresponding to the one uplink demodulation reference signal port.

For example, on the basis of the preceding embodiments of the present application, the value of B in the parameter determination module 702 is determined according to at least one of the following information: the mapping relationship between the X spatial relationship reference signal resources and resources of the uplink element, the mapping relationship between the X spatial relationship reference signal resources and demodulation reference signals of the uplink element, group information corresponding to the X spatial relationship reference signal resources or signaling information.

For example, on the basis of the preceding embodiments of the present application, the parameter determination module 702 includes a resource determination unit configured to, in a case where the X spatial relationship reference signal resources correspond to the same resource of the uplink element, determine the value of B to be equal to 1; or in a case where the X spatial relationship reference signal resources correspond to different resources of the uplink element, respectively, determine the value of B to be greater than 1.

For example, on the basis of the preceding embodiments of the present application, the parameter determination module 702 includes a demodulation determination unit configured to, in a case where the X spatial relationship reference signal resources respectively correspond to different demodulation reference signal ports of the uplink element, determine the value of B to be equal to 1; or in a case where the X spatial relationship reference signal resources correspond to the same demodulation reference signal port of the uplink element, determine the value of B to be greater than 1.

For example, on the basis of the preceding embodiments of the present application, the parameter determination module 702 includes a group information determination unit configured to, in a case where the X spatial relationship reference signal resources correspond to the same group information, determine the value of B to be equal to 1; in a case where the X spatial relationship reference signal resources correspond to different group information, determine the value of B to be greater than 1; determine spatial relationship reference signal resources corresponding to the same group information in the X spatial relationship reference signal resources to correspond to the same one set of power parameters; determine spatial relationship reference signal resources corresponding to the same group information in the X spatial relationship reference signal resources to correspond to different sets of power parameters; or determine the value of B to be equal to the number of pieces of the group information corresponding to the X spatial relationship reference signal resources.

For example, on the basis of the preceding embodiments of the present application, the power determination module 703 is further configured to, in a case where the value of B is equal to the value of X, correspond each of the X spatial relationship reference signal resources to one set of the B sets of power parameters, respectively, and in a case where the value of B is less than the value of X, correspond each spatial relationship reference signal resource group to one set of the B sets of power parameters, respectively, where each spatial relationship reference signal resource group includes at least one spatial relationship reference signal resource.

For example, on the basis of the preceding embodiments of the present application, the X spatial relationship reference signal resources corresponding to the uplink element in the resource determination module 701 include at least one of the following: the uplink element corresponds to the X spatial relationship reference signal resources on the same resource; the uplink element corresponds to the X spatial relationship reference signal resources on C resources, where each resource corresponds to at least one of the X spatial relationship reference signal resources, respectively, and C is a positive integer; or in a case where the uplink element includes an uplink channel, each demodulation reference signal port of the uplink element corresponding to B spatial relationship reference signal resources in the X spatial relationship reference signal resources, respectively.

For example, on the basis of the preceding embodiments of the present application, the resource determination module 701 is configured to obtain spatial information of the uplink element according to the X spatial relationship reference signal resources, where the spatial information includes at least one of a spatial transmit filter or uplink transmit precoding.

For example, on the basis of the preceding embodiments of the present application, the spatial relationship reference signal resources in the resource determination module 701 include at least one of channel SRS resources, CSI-RS resources or SSB resources.

For example, on the basis of the preceding embodiments of the present application, the power parameter in the parameter determination module 702 includes at least one of: a power parameter of the uplink element, a target receiving power parameter, a path loss reference signal resource, a path loss compensation factor or a closed-loop power control index.

FIG. 9 is a structure diagram of an apparatus for determining an antenna port according to an embodiment of the present application. The apparatus for determining an antenna port may perform the method for determining an antenna port provided in the embodiments of the present application and has the corresponding functional modules and beneficial effects for executing the method. The apparatus may be implemented by software and/or hardware and includes a port determination module 801, a data mapping module 802 and a downlink channel module 803.

The port determination module 801 is configured to determine Y antenna ports corresponding to one downlink demodulation reference signal port, where Y is a positive integer greater than 1.

The data mapping module 802 is configured to map data of one layer of a downlink data channel corresponding to the one downlink demodulation reference signal port to the Y antenna ports.

The downlink channel module 803 is configured to receive the downlink data channel on the Y antenna ports.

For example, on the basis of the preceding embodiments of the present application, one layer of data corresponding to the one downlink demodulation reference signal port in the port determination module 801 is repeatedly transmitted on the Y antenna ports.

For example, on the basis of the preceding embodiments of the present application, the Y antenna ports in the port determination module 801 include at least one of the following features: reference signals corresponding to the Y antenna ports occupy the same resource, where the occupied resource includes at least one of: a time-frequency resource, a code domain resource or a sequence resource; the Y antenna ports are antenna ports in a layer-to-antenna port mapping; or each of the Y antenna ports corresponds to one set of quasi co-location reference signal resource sets, respectively.

For example, on the basis of the preceding embodiments of the present application, the reference signals corresponding to the Y antenna ports occupying the same resource in the port determination module 801 includes the following: the resource occupied by the reference signals corresponding to the Y antenna ports are the same as a resource occupied by the downlink demodulation reference signal port.

For example, on the basis of the preceding embodiments of the present application, each of the Y antenna ports corresponding to one set of quasi co-location reference signal resource sets respectively in the port determination module 801 includes the following: each of the Y antenna ports corresponds to one TCI state, respectively; the one set of quasi co-location reference signal resource sets corresponding to each of the Y antenna ports is included in the TCI state; or each of the Y antenna ports and a quasi co-location reference signal in one set of quasi co-location reference signal resource sets corresponding to the respective antenna port satisfy a quasi co-location relationship.

For example, on the basis of the preceding embodiments of the present application, the apparatus further includes a power difference module.

The power difference module is configured to determine at least one of the following according to signaling information or a preset rule: a power difference between any two antenna ports in the Y antenna ports or a power difference between each of the Y antenna ports and a PDSCH.

For example, on the basis of the preceding embodiments of the present application, the power difference between each of the Y antenna ports and the PDSCH in the power difference module includes a power difference between a demodulation reference signal corresponding to each of the Y antenna ports and a PDSCH corresponding to the respective antenna port.

For example, on the basis of the preceding embodiments of the present application, the port determination module 801 includes at least one of the following: the downlink demodulation reference signal port corresponds to the Y antenna ports, and the Y antenna ports correspond to the same resource of the downlink DMRS port; or a layer-to-port mapping relationship is determined according to the number of TCI states corresponding to the downlink demodulation reference signal port on the same resource.

Figure 10:
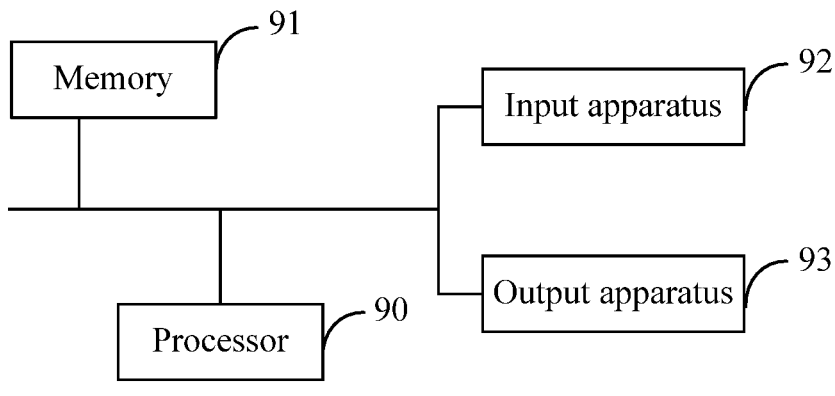
FIG. 10 is a structure diagram of a device according to an embodiment of the present application.

FIG. 10 is a structure diagram of a device according to an embodiment of the present application. As shown in FIG. 10, the device includes a processor 90, a memory 91, an input apparatus 92 and an output apparatus 93. One or more processors 90 may be provided in the device, and one processor 90 is shown as an example in FIG. 10. The processor 90, the memory 91, the input apparatus 92 and the output apparatus 93 in the device may be connected via a bus or in other manners, and the connection via a bus is shown as an example in FIG. 10.

As a computer-readable storage medium, the memory 91 may be configured to store software programs, computer-executable programs and modules, such as modules corresponding to the apparatus for determining a sending power of an uplink element or the apparatus for determining an antenna port in the embodiments of the present application (for example, the resource determination module 701, the parameter determination module 702 and the power determination module 703, or the port determination module 801, the data mapping module 802 and the downlink channel module 803). The processor 90 executes software programs, instructions, and modules stored in the memory 91 to perform function applications and data processing of the device, that is, to implement the preceding methods.

The memory 91 may mainly include a program storage area and a data storage area. The program storage area may store an operating system and an application program required by at least one function, and the data storage area may store data created based on the use of the terminal. Additionally, the memory 91 may include a high-speed random-access memory and may also include a nonvolatile memory, such as at least one disk memory, flash memory or another nonvolatile solid-state memory. In some examples, the memory 71 may include memories which are remotely disposed relative to the processor 90, and these remote memories may be connected to the device via a network. Examples of the preceding network include, but are not limited to, the Internet, an intranet, a local area network, a mobile communication network and combinations thereof.

The input apparatus 92 may be configured to receive inputted digital or character information and generate key signal input related to user settings and function control of the device. The output apparatus 93 may include a display screen and other display devices.

The embodiments of the present application further provide a computer-readable storage medium in which computer-executable instructions, when executed by a computer processor, are used for performing the method for determining a sending power of an uplink element. The method includes the following.

X spatial relationship reference signal resources corresponding to an uplink element are determined.

A power parameter associated with the X spatial relationship reference signal resources is determined.

A sending power of the uplink element is determined according to the power parameter, where X is a positive integer greater than or equal to 1.

The computer-executable instructions, when executed by a computer processor, are further used for performing the method for determining an antenna port. The method includes the following.

Y antenna ports corresponding to one downlink demodulation reference signal port are determined, where Y is a positive integer greater than 1.

Data of one layer of a downlink data channel corresponding to the one downlink DMRS port is mapped to the Y antenna ports.

The downlink data channel is received on the Y antenna ports.

In the storage medium containing computer-executable instructions provided by the embodiments of the present application, the computer-executable instructions implement not only the preceding method operations but also related operations in the method provided by any of the embodiments of the present application.

The preceding are example embodiments of the present application and are not intended to limit the scope of the present application.

It is to be understood by those skilled in the art that the term user terminal encompasses any suitable type of wireless user equipment, for example, a mobile phone, a portable data processing apparatus, a portable web browser or a vehicle-mounted mobile station.

Generally speaking, the various embodiments of the present application may be implemented in hardware or special-purpose circuits, software, logic or any combination thereof. For example, some aspects may be implemented in hardware while other aspects may be implemented in firmware or software executable by a controller, a microprocessor or another calculation apparatus, though the present application is not limited thereto.

Embodiments of the present application may be implemented through the execution of computer program instructions by a data processor of a mobile device, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

A block diagram of any logic flow among the drawings of the present application may represent program operations, may represent interconnected logic circuits, modules, and functions, or may represent a combination thereof. Computer programs may be stored on the memory. The memory may be of any type suitable for the local technical environment and may be implemented by using any suitable data storage technology, such as, but not limited to, a read-only memory (ROM), a random-access memory (RAM), an optical storage apparatus and system (a digital video disc (DVD) or a compact disk (CD)), and the like. Computer-readable media may include non-transitory storage media. A data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (PGA), and a processor based on a multi-core processor architecture.

What is claimed is:

1. A method for determining a sending power of an uplink element, comprising:

determining X spatial relationship reference signal resources corresponding to an uplink element, wherein the uplink element comprises at least one of: an uplink reference signal port or an uplink channel;

determining a power parameter associated with the X spatial relationship reference signal resources, wherein the X spatial relationship reference signal resources correspond to B sets of power parameters, wherein B is a positive integer, and X is a positive integer greater than 1; and determining a sending power of the uplink element according to the power parameter;

wherein determining the sending power of the uplink element according to the power parameter comprises:

obtaining, according to one of B sending powers corresponding to the B sets of power parameters, a sending power of each of B antenna port groups after precoding corresponding to the uplink element, wherein each of the B antenna port groups comprises at least one antenna port.

2. The method of claim 1, wherein determining the sending power of the uplink element according to the power parameter comprises:

determining the sending power of the uplink element according to at least one of a maximum value of B sending powers, a minimum value of B sending powers or an average value of B sending powers;

wherein the B sending powers correspond to the B sets of power parameters.

3. The method of claim 1, wherein obtaining the sending power of each of the B antenna port groups according to one of the B sending powers comprises:

determining a correspondence between the B antenna port groups and the B sets of power parameters according to signaling information to obtain the sending power of each of the B antenna port groups.

4. The method of claim 1, wherein obtaining the sending power of each of the B antenna port groups according to one of the B sending powers further comprises:

in a case where a sum of the B sending powers exceeds a preset value, applying a power scaling factor to at least one of the B sending powers.

5. The method of claim 1, wherein obtaining the sending power of each of the B antenna port groups according to one of the B sending powers comprises at least one of the following:

determining each of the X spatial relationship reference signal resources to correspond to one set of the B sets of power parameters, respectively; or determining a value of X to be the same as a value of B.

6. The method of claim 1, wherein in a case where the uplink element comprises an uplink demodulation reference signal port, one uplink demodulation reference signal port corresponds to at least one phase tracking reference signal port.

7. The method of claim 6, wherein in a case where the one uplink demodulation reference signal port corresponds to more than one phase tracking reference signal port, obtaining a frequency domain resource occupied by each of the more than one phase tracking reference signal port according to the one uplink demodulation reference signal port; and obtaining a transmit beam of each of the more than one phase tracking reference signal port according to one of the X spatial relationship reference signal resources corresponding to the one uplink demodulation reference signal port.

8. The method of claim 1, wherein determining a value of B according to at least one of the following information:

a mapping relationship between the X spatial relationship reference signal resources and resources of the uplink element;

a mapping relationship between the X spatial relationship reference signal resources and demodulation reference signals of the uplink element;

group information corresponding to the X spatial relationship reference signal resources; or signaling information.

9. The method of claim 8, wherein determining the value of B according to the mapping relationship between the X spatial relationship reference signal resources and the resources of the uplink element comprises at least one of:

in a case where the X spatial relationship reference signal resources correspond to a same resource of the uplink element, determining the value of B to be equal to 1; or in a case where the X spatial relationship reference signal resources respectively correspond to different resources of the uplink element, determining the value of B to be greater than 1.

10. The method of claim 8, wherein determining the value of B according to the mapping relationship between the X spatial relationship reference signal resources and the demodulation reference signals of the uplink element comprises at least one of:

in a case where the X spatial relationship reference signal resources respectively correspond to different demodulation reference signal ports of the uplink element, determining the value of B to be equal to 1; or in a case where the X spatial relationship reference signal resources correspond to a same demodulation reference signal port of the uplink element, determining the value of B to be greater than 1.

11. The method of claim 8, wherein determining the value of B according to the group information corresponding to the X spatial relationship reference signal resources comprises at least one of:

in a case where the X spatial relationship reference signal resources correspond to same group information, determining the value of B to be equal to 1;

in a case where the X spatial relationship reference signal resources correspond to different group information, determining the value of B to be greater than 1;

determining spatial relationship reference signal resources corresponding to same group information in the X spatial relationship reference signal resources to correspond to a same set of the B sets of power parameters;

determining spatial relationship reference signal resources corresponding to same group information in the X spatial relationship reference signal resources to correspond to different sets of the B sets of power parameters; or determining the value of B to be equal to a number of pieces of the group information corresponding to the X spatial relationship reference signal resources.

12. The method of claim 1, wherein in a case where a value of B is greater than 1, the method further comprises:

in a case where the value of B is equal to a value of X, corresponding each of the X spatial relationship reference signal resources to one set of the B sets of power parameters, respectively; and in a case where the value of B is less than the value of X, corresponding each spatial relationship reference signal resource group to one set of the B sets of power parameters, wherein the X spatial relationship reference signal resources comprise at least one spatial relationship reference signal resource group, and each of the at least one spatial relationship reference signal resource group comprises at least one spatial relationship reference signal resource.

13. The method of claim 1, wherein the X spatial relationship reference signal resources corresponding to the uplink element comprise at least one of the following:

the uplink element corresponds to the X spatial relationship reference signal resources on a same resource;

the uplink element corresponds to the X spatial relationship reference signal resources on C resources, wherein each of the C resources corresponds to at least one of the X spatial relationship reference signal resources, respectively, and C is a positive integer; or in a case where the uplink element comprises an uplink channel, the uplink element corresponds to at least one demodulation reference signal port, and the at least one demodulation reference signal port respectively corresponds to B spatial relationship reference signal resources in the X spatial relationship reference signal resources.

14. The method of claim 1, wherein the power parameter comprises at least one of: a power parameter of the uplink element, a target receiving power parameter, a path loss reference signal resource, a path loss compensation factor or a closed-loop power control index.

15. A device, comprising:

at least one processor, wherein the at least processor is configured to, upon execution, implement the following:

determining X spatial relationship reference signal resources corresponding to an uplink element, wherein the uplink element comprises at least one of: an uplink reference signal port or an uplink channel;

determining a power parameter associated with the X spatial relationship reference signal resources, wherein the X spatial relationship reference signal resources correspond to B sets of power parameters, wherein B is a positive integer, and X is a positive integer greater than 1; and determining a sending power of the uplink element according to the power parameter;

wherein determining the sending power of the uplink element according to the power parameter comprises:

obtaining, according to one of B sending powers corresponding to the B sets of power parameters, a sending power of each of B antenna port groups after precoding corresponding to the uplink element, wherein each of the B antenna port groups comprises at least one antenna port.

16. The device of claim 15, wherein the at least processor is configured to implement determining the sending power of the uplink element according to the power parameter by:

determining the sending power of the uplink element according to at least one of a maximum value of B sending powers, a minimum value of B sending powers or an average value of B sending powers;

wherein the B sending powers correspond to the B sets of power parameters.

17. The device of claim 15, wherein the at least processor is configured to implement determining the sending power of the uplink element according to the power parameter further by:

in a case where a sum of the B sending powers exceeds a preset value, applying a power scaling factor to at least one of the B sending powers.

18. The device of claim 15, wherein in a case where the uplink element comprises an uplink demodulation reference signal port, one uplink demodulation reference signal port corresponds to at least one phase tracking reference signal port.

19. The device of claim 15, wherein the power parameter comprises at least one of: a power parameter of the uplink element, a target receiving power parameter, a path loss reference signal resource, a path loss compensation factor or a closed-loop power control index.

20. The device of claim 15, wherein the at least processor is configured to implement obtaining the sending power of each of the B antenna port groups according to one of the B sending powers by:

determining a correspondence between the B antenna port groups and the B sets of power parameters according to signaling information to obtain the sending power of each of the B antenna port groups.

* * * * *